ASSEMBLY MACHINE FOR ELECTRONIC COMPONENTS

Filed Sept. 30, 1963 8 Sheets-Sheet 1

INVENTORS
Wendell David Shumaker
Robert A. Lafarge
BY Chalmer Clarence Jordan

Charles L. Lovercheck
ATTORNEY

ASSEMBLY MACHINE FOR ELECTRONIC COMPONENTS

Filed Sept. 30, 1963 8 Sheets-Sheet 2

INVENTORS
Wendell David Shumaker
Robert A. LaFarge
BY Chalmer Clarence Jordan
Charles L. Lovercheck
ATTORNEY INVENTORS
Wendell David Shumaker
Robert A. Lyberger
BY Chalmer Clarence Jordan
Charles L Lovercheck
ATTORNEY

ASSEMBLY MACHINE FOR ELECTRONIC COMPONENTS

Filed Sept. 30, 1963

INVENTORS

BY

ATTORNEY

INVENTORS
Wendell David Shumaker
Robert A. Lybarger
BY Chalmer Clarence Jordan

Charles L. Lovercheck
ATTORNEY

April 25, 1967 W. D. SHUMAKER ETAL 3,316,382

ASSEMBLY MACHINE FOR ELECTRONIC COMPONENTS

Filed Sept. 30, 1963 8 Sheets-Sheet 6

INVENTORS
Wendell David Shumaker
Robert A. Lybarger
BY Chalmers Clarence Jordan

Charles L. Lovercheck
ATTORNEY

April 25, 1967 W. D. SHUMAKER ETAL 3,316,382

ASSEMBLY MACHINE FOR ELECTRONIC COMPONENTS

Filed Sept. 30, 1963 8 Sheets-Sheet 7

INVENTORS
Wendell David Shumaker
Robert A. Lylanger
BY Chalmer Clarence Jordan
Charles L. Lovercheck
ATTORNEY INVENTORS
Wendell David Shumaker
Robert A. Lyberger
BY Chalmer Clarence Jordan
Charles L Lovercheck
ATTORNEY United States Patent Office 3,316,382

Patented Apr. 25, 1967

3,316,382
ASSEMBLY MACHINE FOR ELECTRONIC COMPONENTS

Wendell David Shumaker, Saegertown, Robert A. Lybarger, Meadville, and Chalmer Clarence Jordan, Saegertown, Pa., assignors to Glass-Tite Industries, Inc., Providence, R.I.

Filed Sept. 30, 1963, Ser. No. 312,602
7 Claims. (Cl. 219—79)

This invention relates to assembly machines and, more particularly, to a welding machine for welding ribbons of dissimilar metal onto the ends of wire leads.

In the modern, rapid, automated manufacture of electronic components, including diodes and transistors, it is difficult to assemble the parts accurately and at the necessary production rate.

The ribbon which is welded onto the end of a wire lead in a diode or transistor is often made of precious metal such as platinum and the cost of the tiny piece of platinum is actually greater than the cost of the wire lead. It is, therefore, desirable to salvage any piece of platinum that fails to be welded. Also, it is difficult to weld the platinum to the end of the wire lead unless the end of the lead is perfectly flat and not slanted off as when the lead has been cut by an ordinary shearing machine. The end of the lead must also be completely clean and free of oxide in order for the weld to be efficient.

It is, accordingly, an object of the present invention to provide an improved wire lead welding machine.

Another object of the invention is to provide an improved assembly machine.

Still another object of the invention is to provide a machine for forming a ribbon into a C-shaped bend, an S-shaped bend, or other shapes after ribbon has been welded to the end of a wire.

A further object of the invention is to provide an improved machine for processing the end of a wire lead in a transistor assembly machine.

Yet a further object of the invention is to provide an assembly machine which is simple in construction, economical to manufacture, and simple and efficient in operation.

With the above and other objects in view, the present invention consists of the combination and arrangement of parts hereinafter more fully described, illustrated in the accompanying drawings, and more particularly pointed out in the appended claims, it being understood that changes may be made in the form, size, proportions, and minor details of construction without departing from the spirit or sacrificing any of the advantages of the invention.

Figure 1:
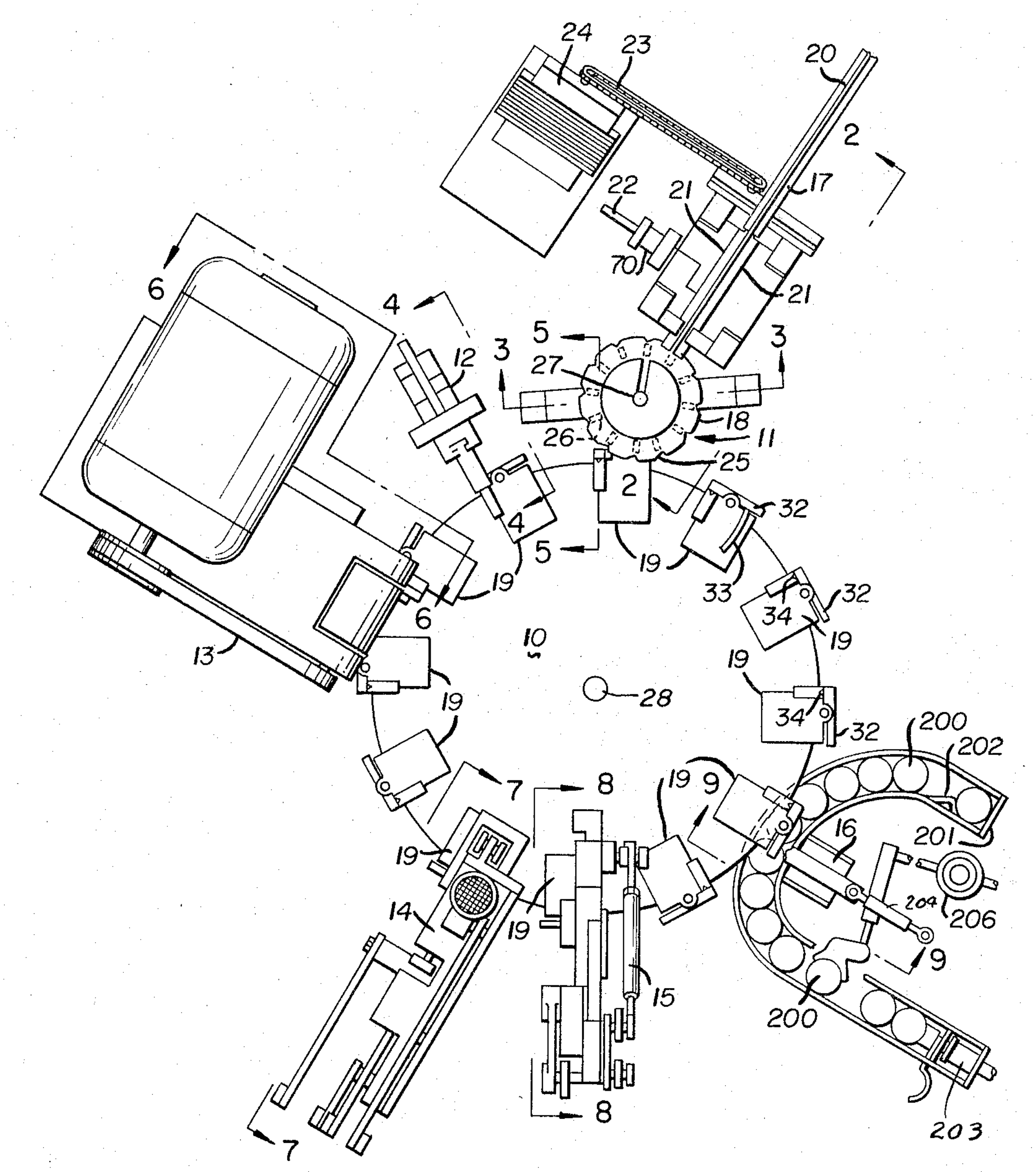
FIG. 1 is a top view of a machine according to the invention.

Now with more particular reference to the drawings FIG. 1 shows the machine having a turret 10, a feeding station 11, a positioning station 12, a milling station 13, a welding station 14, a forming station 15, and a discharge station 16. Wires having glass beads fused at an intermediate part thereon are fed down a track 17 into a feeding wheel 18 and, from thence, are fed to supporting stations 19 on the turret 10.

The parallel rails of the track 17 are spaced to form a groove 20 therebetween and wire leads may be fed to this groove from a vibratory feeder or the like which properly orientates them. A glass bead rests on top of the track while a wire extends down therebetween. The wire moves frictionlessly between cylindrical rollers 21 which are driven by bevel gears from a shaft 22. The rollers 21 are driven by a belt 23 which is, in turn, rotated by a motor 24. An escapement mechanism is made up of a lead screw which is mounted on the shaft 22.

Figure 2:
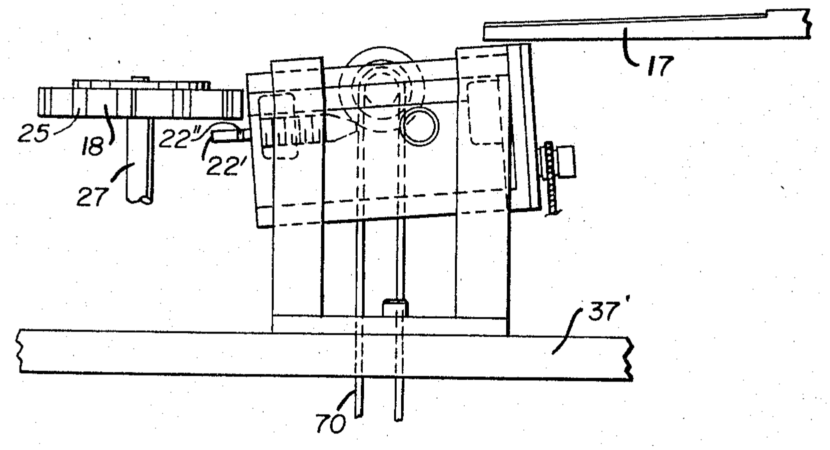
FIG. 2 is a cross sectional view taken on line 2—2 of FIG. 1 showing a part of the feeding mechanism for the machine.
Figure 3:
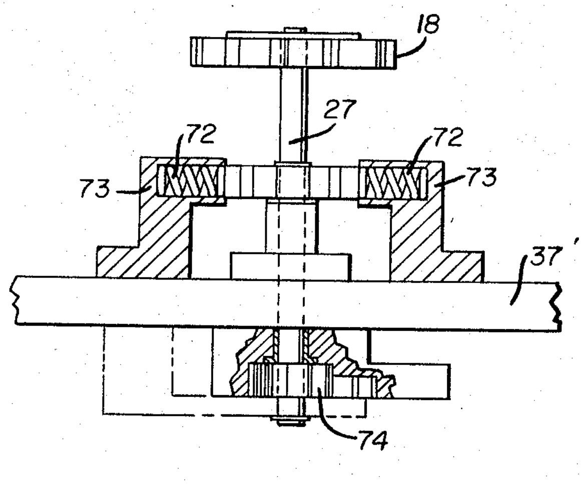
FIG. 3 is an enlarged view taken on line 3—3 of FIG. 1 showing the magnetic chuck arrangement.

As shown in FIG. 2, a screw 22' has a groove 22'' which receives one beaded wire on each revolution thereof and this is timed with the indexing of the wheel 18. Thus, each time the screw 22' rotates one pitch lead, a beaded wire is caught in its groove 22'' and is fed to one of the notches 25 on the wheel 18.

The wheel 18 has the spaced notches 25 in its periphery and inset in the wheel at each notch is a permanent magnet 26. One end of each permanent magnet terminates adjacent each notch 25 so that the magnetic material of the wires is attracted to the magnets 26 and held firmly in position in the notches 25.

The wire may be .020 inch in diameter, for example, and the individual pieces may be approximately two inches long, for example. The wheel 18 is rotated about its central shaft 27 by a timing mechanism on the underside of the turret 10. The timing mechanism and other components of those disclosed herein are driven by a synchronized set of cams in a manner well known to those skilled in the art and of the type shown in patent application, Ser. No. 740,966, now Patent 3,128,529.

The turret 10 is indexed about its central axis 28 and the indexing is synchronized with the rotation of the wheel 18. All of the other components of the machine are synchronized as aforesaid.

Figure 5:
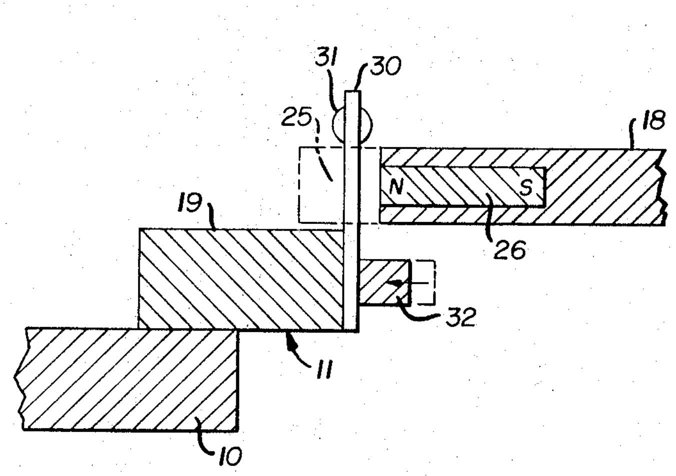
FIG. 5 is an enlarged cross sectional view taken on line 5—5 of FIG. 1 of the chuck arrangement.

The spaced stations 19 are supported at spaced intervals around the periphery of the turret 10. Each station 19 is particularly shown in FIG. 5. Here, wire leads 30 having glass beads 31 hermetically sealed thereon are attracted by the magnets 26 to the wheel 18. As they are brought to the stations 19, levers 32 which are spring urged inwardly by springs 33 are swung outwardly each time they engage a cam supported on the machine under the wheel 18.

As shown in FIG. 1, the wire lead 30 is moved between the lever 32 and the notched member of the station 19 in one of the notches 34. As the turret 10 indexes, the lever 32 which has just passed the station 11 moves away from the cam actuating member and the lever 32 is spring urged into engagement with the lead 30, clamping it in the notch 34 as the turret 10 indexes the lead from the station 11 to the positioning station 12.

Figure 4:
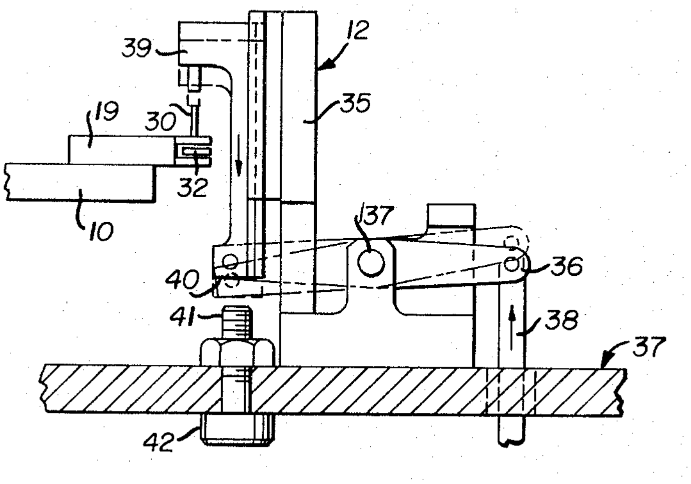
FIG. 4 is a view taken on line 4—4 of FIG. 1 of the push down arrangement for positively locating the beaded lead in the machine.

The locating or positioning station 12 is specifically shown in FIG. 4. A support 35 at the positioning station 12 is fixed in position to the main machine frame which has a rocking lever 36 pivoted at 37 to a fixed machine frame 37′. The lever 36 is actuated by a link 38 which extends down below the machine to the main cam timing mechanism.

A push down post 39 has a lower end 40 which engages an upper surface 41 of an adjusting screw 42. The screw 42 may be adjusted in the frame 37′ to limit the downward movement of the push down post 39 to precisely position the top end of the wire lead 30 in the station 19 so that when it reaches the milling station 13, its top will be precisely positioned relative to the milling cutter.

The next index movement of the turret 10 moves the beaded lead which has been precisely positioned at the station 12 to the milling station 13 where the upper end of the beaded wire is milled off square relative to the wire. This is done in order to remove the oxide from the end preparatory to welding and, also, to provide a flat platform to receive the platinum ribbon.

Figure 6:
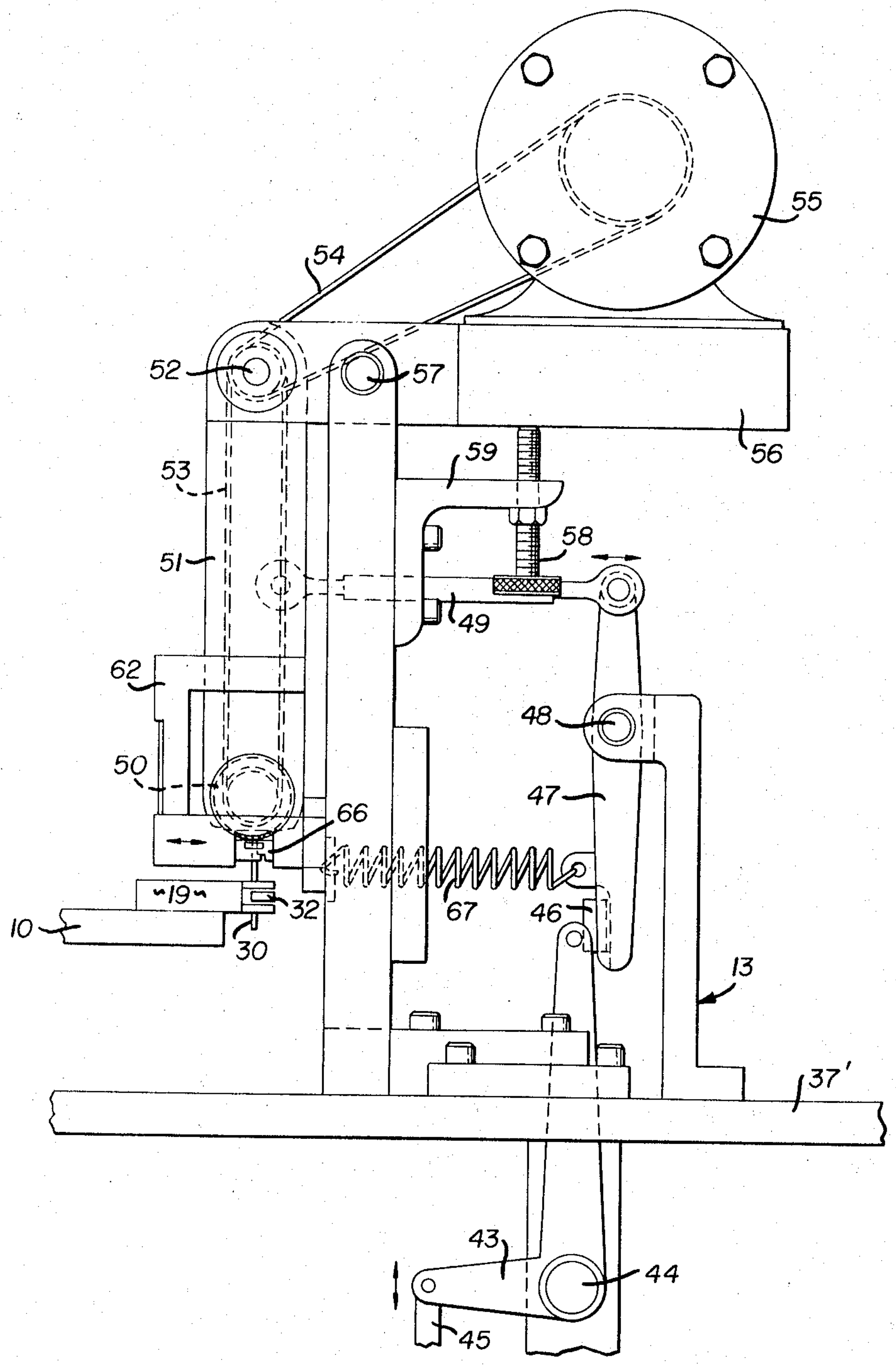
FIG. 6 is a side view of the lead milling arrangement taken on line 6—6 of FIG. 1.

The milling station 13 is particularly shown in FIG. 6. The milling station is supported on the fixed machine frame 37′ and actuated by means of a bellcrank 43 which is pivoted to the machine frame at 44 and actuated by a link 45 which is itself actuated by the main timing mechanism under the turret. An end 46 of the bellcrank 43 engages an actuating link 47 to swing it about its fixed pivot 48 and through a link 49 to cause a milling wheel 50 to traverse across the upper end of the beaded lead 30. The wheel 50 has a surface made of a hard material and it is driven at a high speed.

The milling wheel 50 is driven through a belt 53 which is, in turn, driven by a belt 54 by means of a motor 55 which is supported on a platform 56. The platform 56 is pivotally supported on the frame 37′ at 57 and may be adjusted up and down by means of an adjusting screw 58 which extends through a bracket 59 and engages the underside of the platform 56. Thus, the milling wheel may be raised or lowered by loosening or tightening the screw 58 to move a carriage support 51 up or down.

A movable jaw 60 is slidably supported on an arm 62 and a fixed jaw 66 is fixed to the machine frame 37′. The carriage support or link 51 is urged toward the fixed jaw 66 by means of a spring 67. As shown in FIG. 7B, a pin 63 is fixed to the movable jaw 60 and received in a notch 64 between the arm 62 and a leaf spring 68. The spring 68 is fixed to the arm 62 by means of screws 65. Thus, when the carriage link 51 moves the milling wheel or cutter 50 to the right urged by the spring 67, the movable jaw 60 first engages the beaded lead 30 and urges it against the fixed jaw 66 so that an upper end 69 of the lead 30 is disposed only slightly above the top surface of the fixed jaw 66. Then as the milling cutter wheel 50 moves further to the right, the spring 68 is deflected, urging the movable jaw 60 to the right and the upper end of the lead 30 is disposed above the fixed jaw 66 so that the milling cutter wheel 50 is urging the lead 30 against a solid surface to give a positive back-up surface for milling. When the arm 62 is retracted, the pin 63 is pulled back with it.

Figure 7:
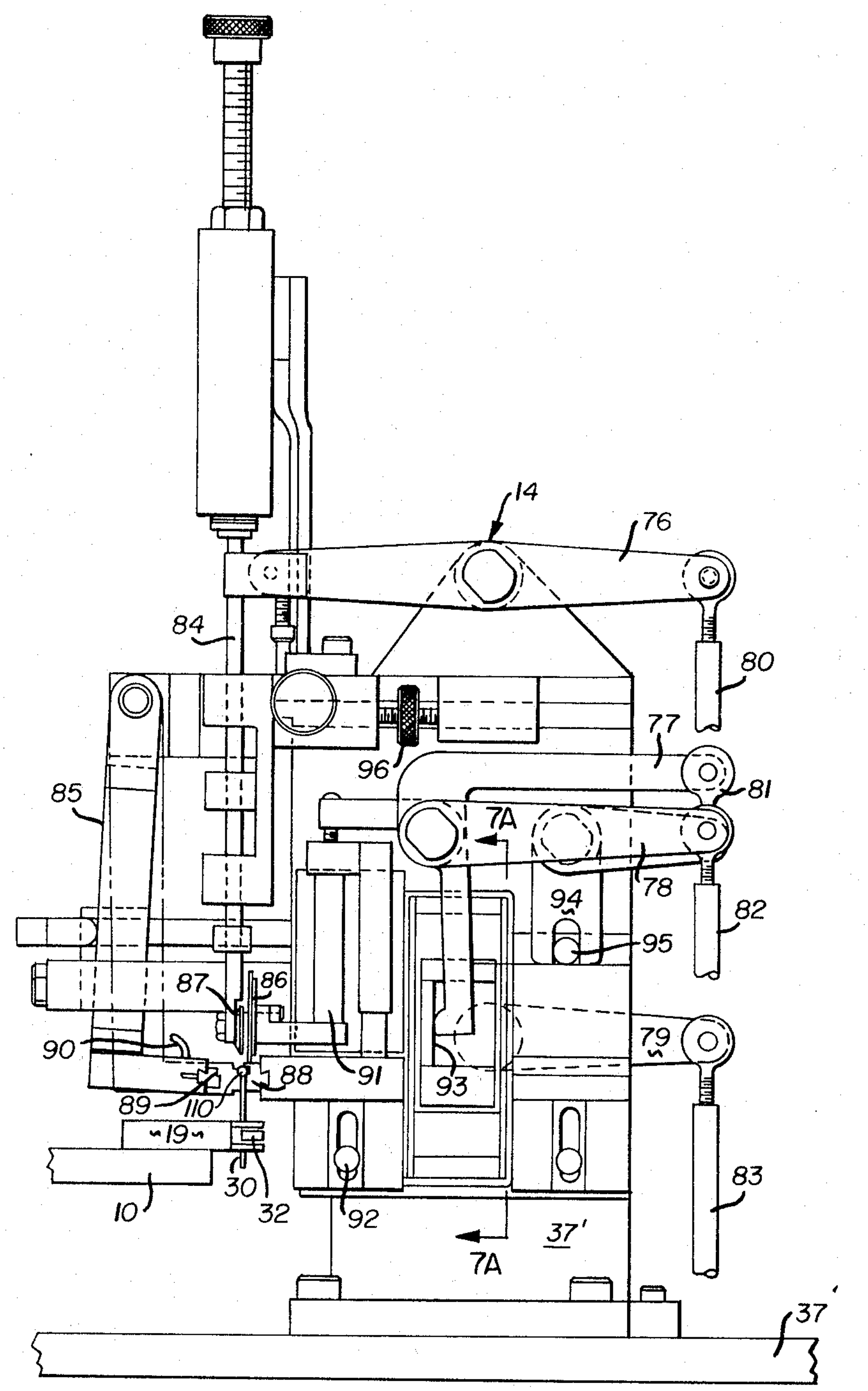
FIG. 7 is a side view of the welding arrangement for the machine taken on line 7—7 of FIG. 1.
Figure 7B:
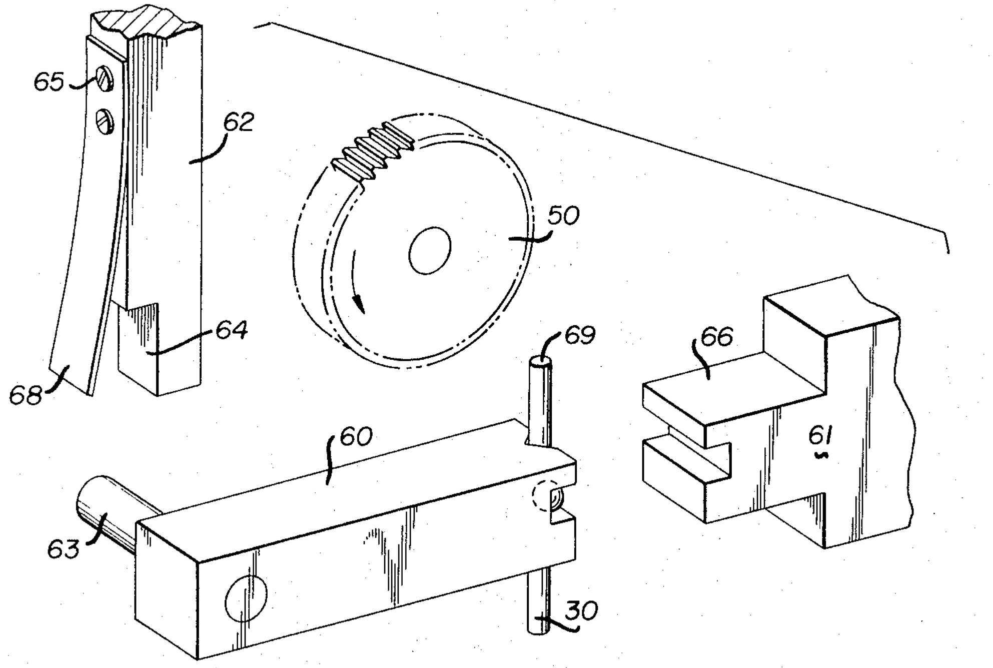
FIG. 7B is an enlarged view of some of the parts of FIG. 7.
Figure 7A:
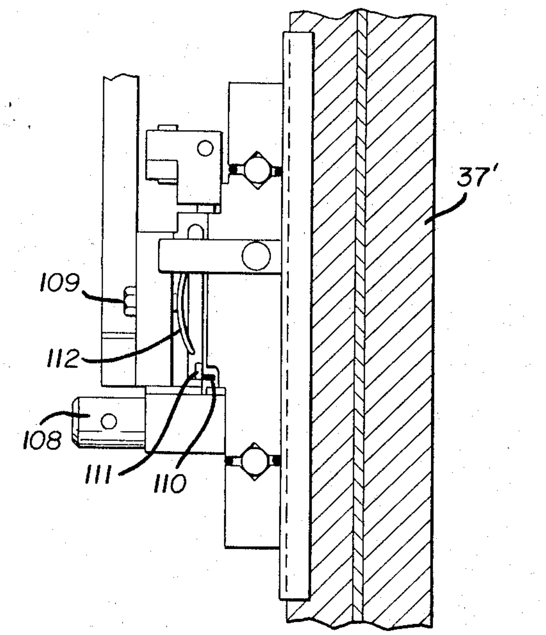
FIG. 7A is an enlarged view taken on line 7A—7A of FIG. 7 of the feeding arrangement for the platinum ribbon in connection with the welder.

After the beaded lead has the upper end thereof milled off precisely to a flat surface, the lead is indexed to the welding station 14 shown in FIGS. 7 and 7A. The elements of the welding station are actuated by links 76, 77, 78, and 79 actuated from a timing mechanism under the turret through links 80, 81, 82, and 83, respectively.

The welding station 14 is supported on the frame 37′ and has an electrode 87 attached to a rod 84 which is moved up and down by the link 76 actuated by the electrode lever or link 80.

The jaws are opened and closed by the link 79 actuated by link 83 which moves a swinging lever 85 having a jaw 89 fixed thereto into engagement with a jaw 88.

The cutting wheel 50 is actuated by the link 77 which is, in turn, actuated by the link 81.

The electrodes 86 will clamp the platinum wire to the fixed jaw 88 during the time that the welding electrode 87 engages it.

The platinum feed is shown in FIG. 7A. Here, a platinum wire 110 is fed out across the top of the lead 30. A tension is held on the platinum wire by means of a spring 112 acting through a detent 111 so that if the wire does not weld successfully, it will be pulled back by the friction exerted on it by the spring 112. The block supporting the spring 112 is held in place by a bolt 109.

Figure 8:
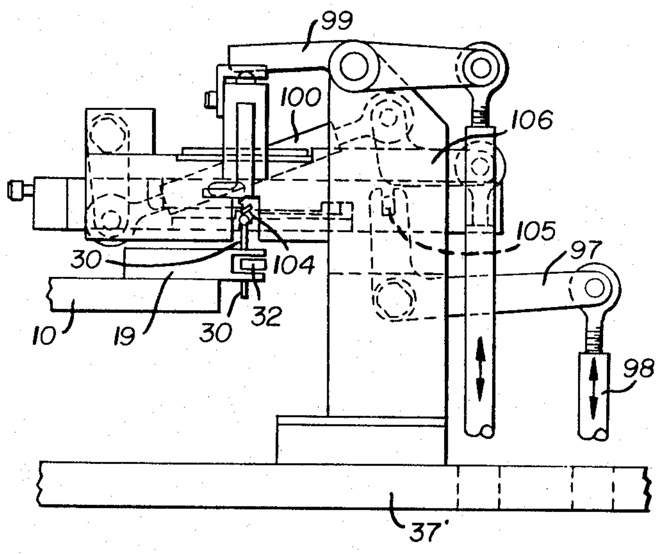
FIG. 8 is a view taken on line 8—8 of FIG. 1 showing the ribbon forming mechanism.

The forming station 15 shown in FIG. 8 forms a welded ribbon 104 to the desired shape. Here, the lead 30 is clamped between the fixed jaw and movable jaw on the station. Then the lever 97 actuated by link 98 moves the lower jaw inward by means of a pivot 105. This forms a C-shape of the ribbon. Then the pin is actuated by lever 99 through the link shown to form the ribbon into an S-shape.

Figure 9:
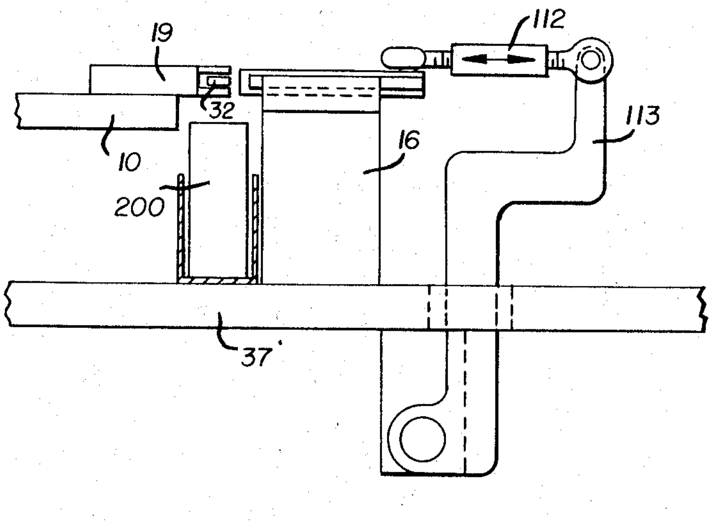
FIG. 9 is a view taken on line 9—9 of FIG. 1 of the unloading arrangement.
Figure 10:
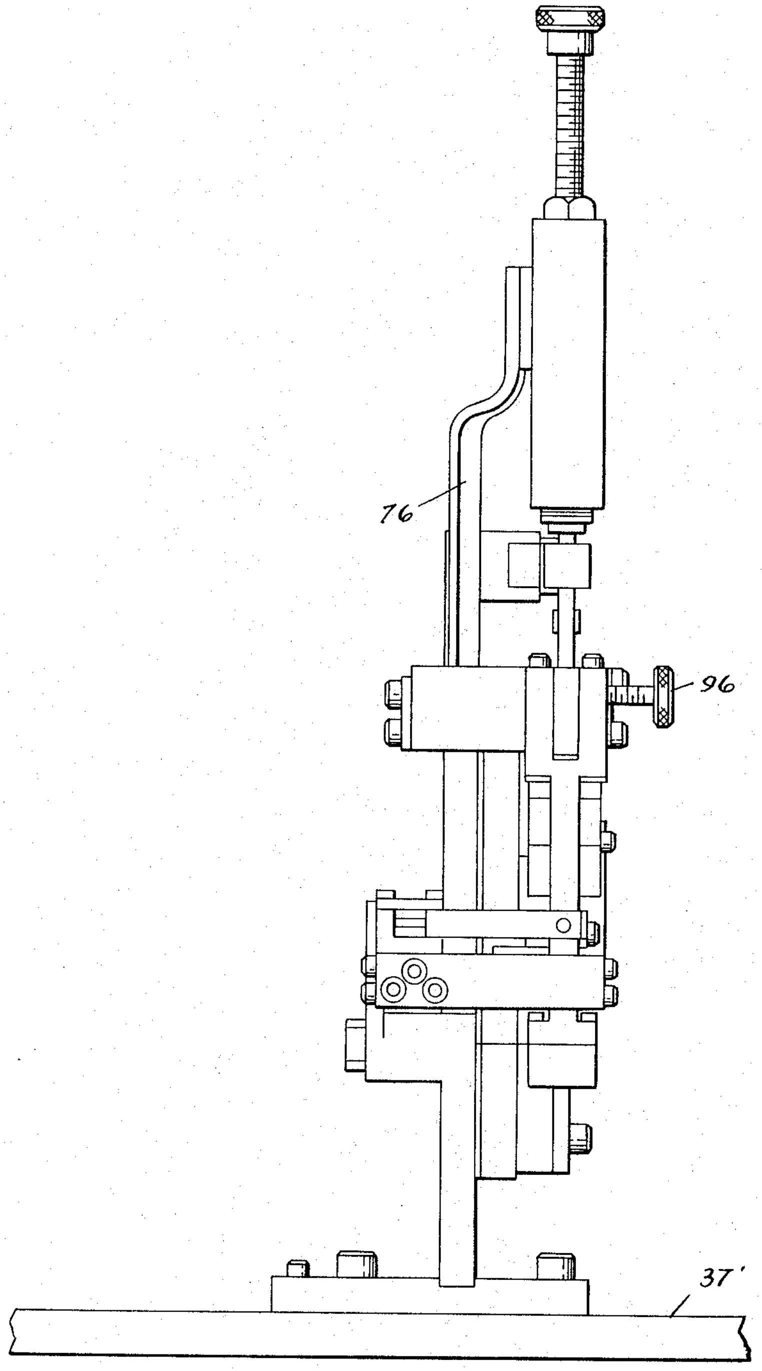
FIG. 10 is a rear view of the welding arrangement of FIG. 7.

The discharge station 16 shown in FIG. 9 swings the lever 32 outward against its spring pressure to release the wire lead and drop into vial 200. This is accomplished by spring 112 actuated by lever 113. The vials 200 are dropped into the track shown in FIG. 1 and are retained by a detent 202. Each time a new vial is fed in through the mechanism 203, another is discharged past the escapement 204 actuated by a member 206.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In a machine for preparing wire for welding it to short lengths of ribbon on the prepared end of said wire and for forming said ribbon to predetermined shapes comprising
- a turret,
- means to rotate said turret,
- spaced wire holding means on the periphery of said turret,
- means on said machine to feed lengths of wire to said wire holding means,
- means to move an end of a ribbon to position on the end of said wire,
- means on said machine to remove metal from one end of said wire to flatten said end, thereby forming a flattened end,
- means on said machine to sever the flattened end of said wire and an end of said ribbon from said ribbon,
- and means to retract said ribbon and without severing when said flattening fails whereby said ribbon end is saved.

2. In a machine for welding short lengths of ribbon on the end of wire and for forming said ribbon to predetermined shapes comprising
- a turret,
- means to rotate said turret,
- spaced wire holding means on the periphery of said turret,
- means on said machine to feed lengths of wire to said wire holding means,
- means to move an end of a ribbon to position on the end of said wire,
- means on said machine to weld the end of a ribbon to the end of each of said wires,
- means to sever said welded end of said ribbon from said ribbon,
- and means to retract said ribbon and without severing when said welding fails whereby said ribbon end is saved.

3. The machine recited in claim 2 wherein
- means is provided on said machine to form said welded end of ribbon into a predetermined shape.

4. A machine for assembling electrical components comprising
means to hold a wire,
means to remove material from an end of said wire whereby said end is flattened,
means to weld a ribbon of material to said flattened end,
said means to hold said wire comprising a movable support having a holding means for said wire thereon,
a fixed jaw, said movable support having means to move said wire into proximate position to said fixed jaw,
a movable jaw,
and means to move said movable jaw into position to clamp said wire between it and said fixed jaw,
said means to remove material comprising a wheel having material removing means on its outer periphery,
said wheel being movably supported on said movable jaw whereby said wheel moves over said wire end after said movable jaw engages said wire.

5. A machine for assembling electrical components comprising
means to hold a wire,
means to remove material from an end of said wire whereby said end is flattened,
means to weld a ribbon of material to said flattened end,
a welding station,
said welding station comprising clamping jaws to clamp said wire,
means to feed a ribbon of metal outward over said wire,
welding means comprising a wheel with means to move it into engagement with said ribbon to weld said ribbon to said wire,
and frictional means adapted to slide on said ribbon when said ribbon is successfully welded,
said frictional means retracting said ribbon when it fails to be welded.

6. The machine recited in claim 4 wherein
an arm is provided on said machine,
said movable jaw is supported on the lower end of said arm,
a spring is provided on said arm,
said movable jaw is urged to a first position by said spring,
said movable jaw being adapted to be stopped when it engages said wire and said fixed jaw and said wheel moving with said arm relative to said wire as said arm swings further whereby material on the end of said wire is removed.

7. A machine for assembling electronic components comprising a turret, means to feed wires to said turret, means to support said wires on said turret,
means on said machine to weld a ribbon to the end of each said wire and means to form the end of each said wire, and means to retract said ribbon in the event said welding fails,
said forming means comprising a clamping means to clamp each said wire as it reaches said forming station,
and a blade adapted to engage said ribbon and force a part of it to conform generally to a member on said machine.

References Cited by the Examiner

UNITED STATES PATENTS

| | | | |
|---|---|---|---|
| 2,779,993 | 2/1957 | Pityo | 29—155.5 |
| 2,915,616 | 12/1959 | Griffin | 219—79 |
| 2,928,929 | 3/1960 | Hotze et al. | 219—80 |
| 3,005,900 | 10/1961 | Pityo | 219—79 |

ANTHONY BARTIS, *Primary Examiner.*

RICHARD M. WOOD, *Examiner.*

B. A. STEIN, *Assistant Examiner.*